United States Patent [19]

Miller

[11] Patent Number: 4,730,408
[45] Date of Patent: Mar. 15, 1988

[54] FISHING ROD HOLDER

[76] Inventor: Earl V. Miller, Box 48, Easton, Mo. 64443

[21] Appl. No.: 886,730

[22] Filed: Jul. 18, 1986

[51] Int. Cl.⁴ .............................................. A01K 97/12
[52] U.S. Cl. ........................................... 43/15; 43/16; 43/21.2
[58] Field of Search ............................ 43/16, 15, 21.2; 248/530, 532, 533

[56] References Cited

U.S. PATENT DOCUMENTS

| 2,645,050 | 7/1953 | Golias | 43/21.2 |
|---|---|---|---|
| 2,918,746 | 12/1959 | Hamrick | 43/15 |
| 2,964,868 | 12/1960 | Bennett | 43/15 |
| 2,996,824 | 8/1961 | Faycosh | 43/16 |
| 3,453,765 | 7/1969 | Gibbons | 43/15 |
| 3,802,652 | 4/1974 | Holton | 43/21.2 |
| 3,803,744 | 4/1974 | de Beixedon | 43/15 |
| 4,159,589 | 7/1979 | Pendegraft | 43/15 |
| 4,235,035 | 11/1980 | Guthrie | 43/15 |
| 4,461,113 | 7/1984 | Erwin | 43/15 |
| 4,476,645 | 10/1984 | Paarmann | 43/15 |
| 4,676,018 | 6/1987 | Kimball | 43/15 |

Primary Examiner—Kurt Rowan
Attorney, Agent, or Firm—Kokjer, Kircher, Bradley, Wharton, Bowman & Johnson

[57] ABSTRACT

A device which holds a fishing rod and automatically sets a fishhook in a fish. A stake driven into the ground supports a pivot arm on which the rod is held. A trip lever holds the arm in position for fishing and is released by a trigger wire when the fishing line is subjected to a pulling force caused by a strike on the bait. A spring then pivots the arm upwardly in an abrupt and forceful manner to set the fishhook.

6 Claims, 6 Drawing Figures

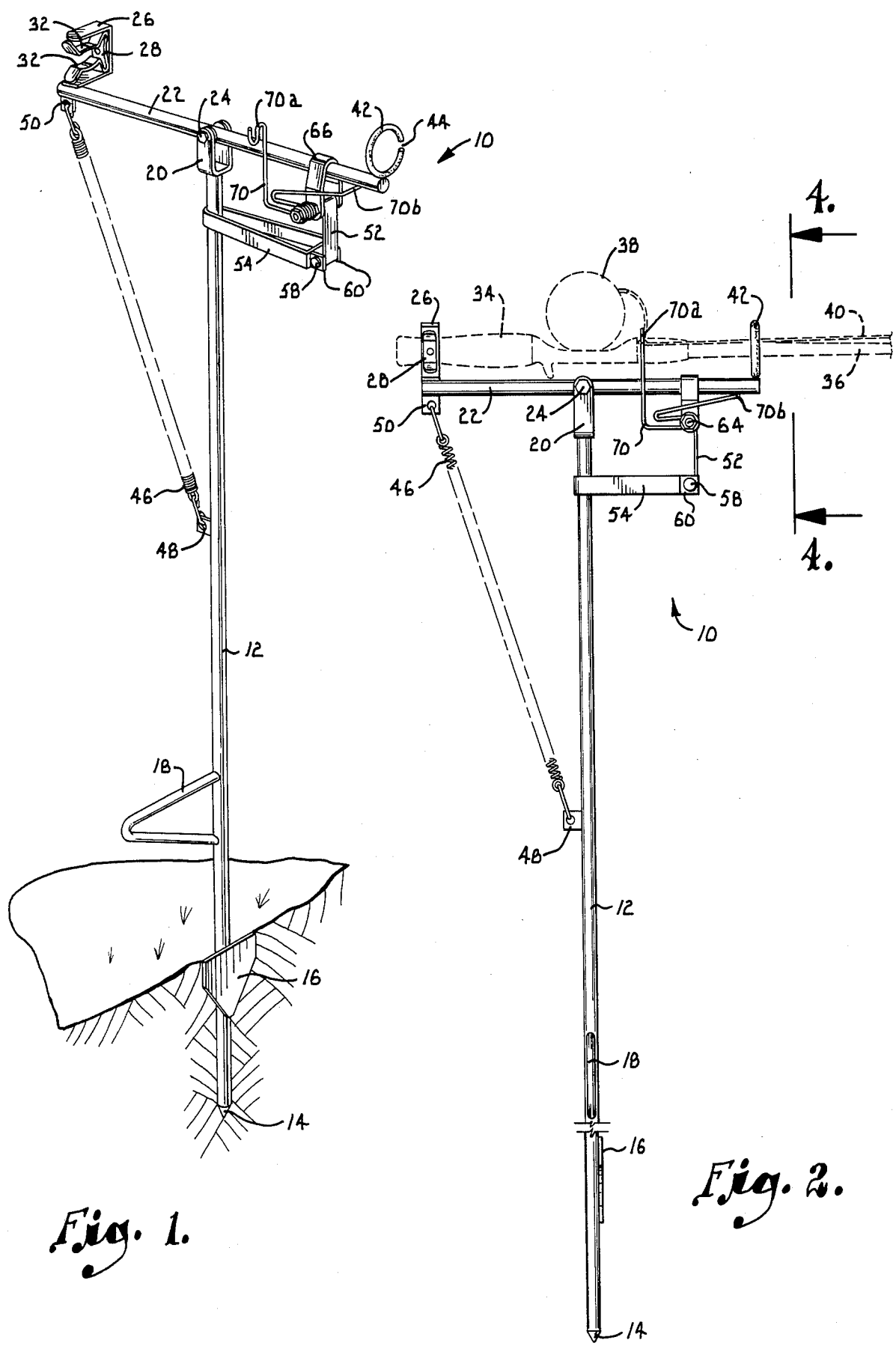

FISHING ROD HOLDER

BACKGROUND AND SUMMARY OF THE INVENTION

This invention relates in general to the field of fishing gear and more particularly to a device which holds a fishing rod and acts automatically to set the fishhook in a fish taking the bait.

In the past, various types of devices have been developed for holding fishing rods so that the fisherman is free to engage in other activities. All of the rod holding devices known to me are passive devices which require human assistance in setting of the fishing hook in the event of a fish taking the bait. One known device includes a light that comes on when a fish nibbles on the bait, thus alerting the fisherman to the fact that he must take action. To my knowledge, there have been no devices available that act both to hold a fishing rod and also to set the hook in response to a bite.

Accordingly, it is the primary object of my invention to provide a device which holds a fishing rod in position for fishing and responds automatically to set the fishhook in a fish striking on the bait.

Another object of the invention is to provide a device of the character described which functions to firmly set the hook at the appropriate time while ignoring minor pulls on the fishing line resulting from forces other than a true strike.

A further object of the invention is to provide a device of the character described which is light weight and portable and which can be quickly and easily set up at virtually any desired location.

An additional object of the invention is to provide a device of the character described which is constructed to securely hold a fishing rod in a stable manner and to prevent the rod and related equipment from being pulled into the water or otherwise subjected to damage.

A still further object of the invention is to provide a device of the character described which is simple and economical and yet has a rugged and durable construction for service over an extended operating life.

Yet another object of the invention is to provide a device of the character described which is simple to use and which operates safely.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a fishing rod holder constructed according to a preferred embodiment of the present invention, with the pivot arm set to hold a fishing rod in position for fishing;

FIG. 2 is a side elevational view of the fishing rod holder, with a fishing rod shown fragmentarily in broken lines in position for fishing;

DETAILED DESCRIPTION OF THE INVENTION

Figure 3:
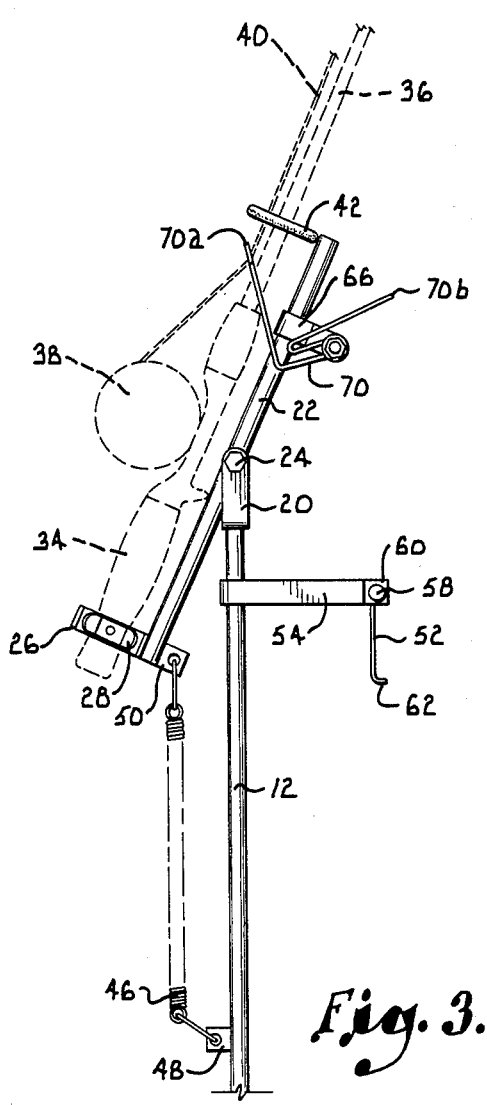
FIG. 3 is a fragmentary side elevational view similar to FIG. 2, but showing the pivot arm and fishing rod raised to the hook setting position in response to a fish taking the bait.

Referring now to the drawings in more detail, numeral 10 generally designates a fishing rod holding device constructed according to a preferred embodiment of the present invention. The device 10 includes an elongate metal stake 12 which provides an upright stanchion on which the operating components are supported. Stake 12 is preferably about three feet long and has a pointed tip 14 on its lower or base end to facilitate setting of the stake in the ground. A flat spade anchor 16 is secured to stake 12 a short distance above the tip 14. An insertion step 18 is provided on the stake a short distance above the anchor 16. The anchor 16 helps to retain the stake in place in the ground, while the insertion step 18 receives the foot when the stake is to be driven into the ground.

The upper end of stake 12 is provided with a U-shaped clevis 20 to which a metal pivot arm 22 is connected. A pivot bolt 24 extends through the clevis 20 and pivot arm 22 to provide a horizontal pivot axis about which arm 22 may pivot between the horizontal position shown in FIG. 1 and the raised or hook setting position shown in FIG. 3. Arm 22 is pivoted to stake 12 near the mid point of the arm.

The back end of arm 22 carries a C-shaped metal bracket 26 which may be welded or otherwise secured to the arm. A spring clip 28 is mounted within bracket 26 by a suitable fastener 30 (See FIG. 4). The spring clip 28 includes spaced apart upper and lower arms 32 which act to grip against the handle 34 on the butt end of a fishing rod 36, as best shown in FIGS. 2 and 3. The fishing rod 36 is equipped with the usual reel 38 around which a fishing line 40 is wound. The line 40 extends along rod 36 and is provided on its end with a baited hook 41 (FIG. 3) in the usual manner. When the handle 34 is inserted in the spring clip 28, the spring arms 32 are deflected somewhat away from one another and act by spring action to grip against the handle 34, thereby securely holding the handle.

A metal ring 42 is welded or otherwise secured on the front end of the pivot arm 22. Ring 42 is large enough to receive the rod 36 in extension through the ring. A split 44 is formed in ring 42 in order to permit rod 32 to be inserted into and removed from the ring. Ring 42 is too large to allow the reel 38 to pass through it, and the spring clip 28 and ring 42 thus cooperate to securely hold the fishing rod on the pivot arm 22. It is noted that spring clip 28 is open on the side opposite the split 44 in ring 42.

The pivot arm 22 is continuously urged toward the hook setting position of FIG. 3 by a tension spring 46. The lower end of spring 46 is hooked to an ear 48 which is secured to stake 12 at a location well below the clevis 20. The opposite or upper end of spring 46 is hooked to another ear 50 which is secured to the back end of arm 22. When the pivot arm 22 is in its horizontal position for holding of the fishing rod in the fishing position, spring 46 is placed under tension and thus acts to urge arm 22 toward the hook setting position.

Figure 5:
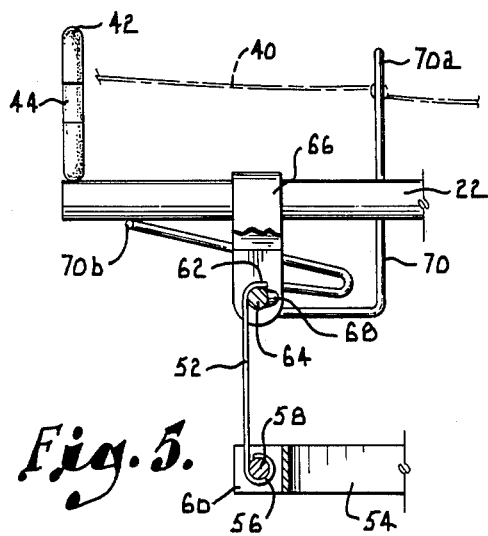
FIG. 5 is a fragmentary sectional view taken generally along line 5—5 of FIG. 4 in the direction of the arrows and showing the trip lever and trigger wire in the positions they occupy during fishing activity.
Figure 6:
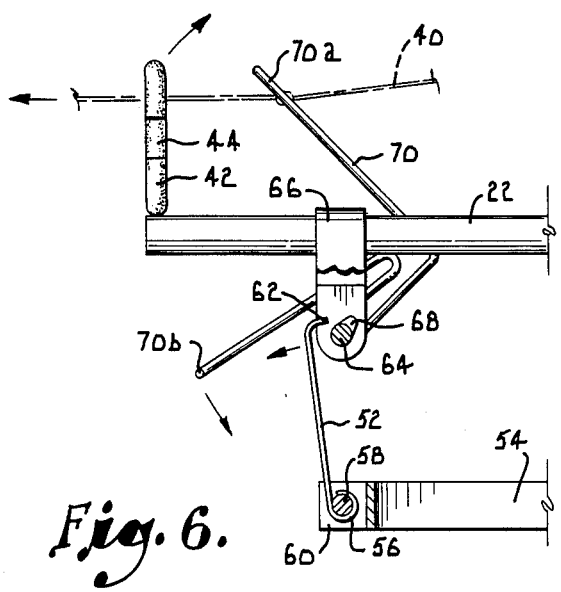
FIG. 6 is a fragmentary sectional view similar to FIG. 5, but showing the trip lever released by the trigger wire in response to a fish taking the bait.

A trip lever 52 is carried on the front end of a bracket 54 which is secured to stake 12 at a location slightly below the clevis 20. As best shown in FIGS. 5 and 6, one end of lever 52 is formed as a sleeve 56 which is fitted somewhat loosely around a horizontal pin 58 extending between a pair of ears 60. The ears 60 are mounted on the forward end of bracket 54. The fit of sleeve 56 on pin 58 allows lever 52 to pivot about the axis of pin 58 for a purpose that will be made clear.

A flange 62 is formed on the end of lever 52 opposite sleeve 56. In order to hold pivot arm 22 in the fishing position, flange 62 is hooked on a horizontal bolt 64 which serves as a keeper for the trip lever 52. Bolt 64 is supported for axial rotation on the lower end of a U-shaped bracket 66 which is welded or otherwise secured to arm 22 at a location between clevis 20 and ring 42. Bolt 64 is located directly above pin 58. Bolt 64 extends loosely through the two legs of bracket 66 and is provided between the two legs of the bracket with a projecting bead 68 (see FIGS. 5 and 6). The bead 68 may be formed by welding metal applied to the shank of bolt 64. As will be explained more fully, the bead acts to push the trip lever 52 off of bolt 64 in response to a strike on the fishing bait.

Figure 4:
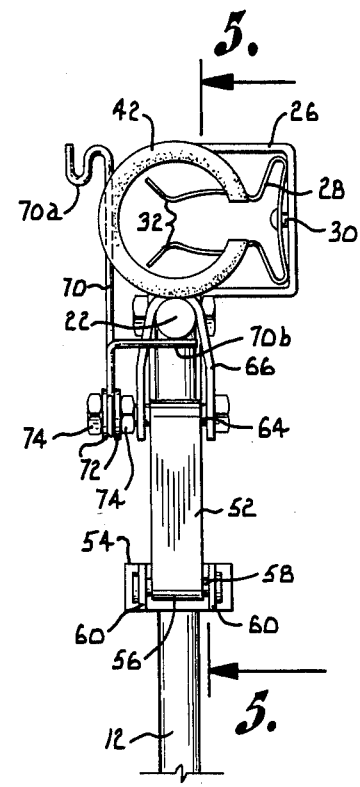
FIG. 4 is a fragmentary front elevational view on an enlarged scale taken generally along line 4—4 of FIG. 2 in the direction of the arrows.

As best shown in FIG. 4, bolt 64 extends well beyond one of the legs of bracket 66. A trigger wire 70 is looped near its mid portion closely around the projecting end of bolt 64 and is securely clamped to the bolt by a pair of washers 72 and nuts 74. The nuts 74 are threaded onto bolt 64, while washers 70 are tightened against opposite sides of wire 70 to rigidly connect the wire to bolt 64.

The wire 70 is bent upwardly at a location to the rear of bolt 64, and its upper end is bent to form an S-shaped double loop 70a to which the fishing line 40 may be tied. Loop 70a is located above arm 22 and to the rear of bolt 64. The end of wire opposite loop 70a is bent to provide a horizontal arm 70b which is normally in contact with the underside of the front end of arm 22 to maintain loop 70a in the position shown in FIG. 2.

In use, the rod holding device 10 is set up by driving stake 12 into the ground at the selected location. The pointed tip 14 facilitates entry of the stake into the ground, while the insertion step 18 allows the foot to be used for setting of the stake. Once the spade anchor 16 is below the surface, stake 12 is properly set. The spade anchor resists turning of the stake in the ground. Stake 12 should be set in a substantially upright position, although it can be inclined somewhat if desired.

After stake 12 has been set in the ground, pivot arm 22 is moved to the horizontal position, and the trip lever 52 is then pivoted until its flange 62 is hooked on bolt 64 in the position shown in FIG. 5. Lever 52 grips against bolt 64 and thus serves to hold arm 22 in the horizontal position against the force of the tension spring 46.

After the fishing line 40 has been then cast into the water, rod 36 is inserted through ring 42 and handle 34 is inserted into the spring clip 28. Reel 38 should then be wound in until the slack is taken out of the fishing line 40, and the reel 38 can then be locked. The line 40 can be suitably tied to loop 70a, preferably by winding it around the loop two or three times.

The fisherman can then engage in other activities, and the rod holding device 10 holds the fishing rod in the fishing position shown in FIG. 2. The rod extends generally horizontally, and the fishing line extends into the water. As shown in FIG. 5, bead 68 is displaced slightly from the edge of flange 62.

When a fish strikes at the bait carried on the fish hook, a pulling force is applied to the fishing line 40, and this force is applied to loop 70a, thus pulling the trigger wire 70 to the triggered position shown in FIGS. 3 and 6. Movement of wire 70 to the triggered position causes bolt 64 to rotate in a counter clockwise direction as viewed in FIGS. 5 and 6, and this rotation carries bead 68 around to act against the free edge of flange 62. The bead thus pushes flange 62 forwardly and disengages the flange from bolt 64. Trip lever 52 is then released from bolt 64, and there is then nothing holding pivot arm 22 in the fishing position. Consequently, once lever 52 releases, the tension force applied by spring 46 causes arm 22 to pivot abruptly and forcefully to the hook setting position shown in FIG. 3. In the hook setting position, the front end of arm 22 is raised and the rear end of the pivot arm is lowered, and this raises the tip end of the fishing rod 36 in order to forcefully set the fish hook in the fish that has taken the bait. The fisherman can then reel in the fish in the usual manner, and he can thereafter again set the device 10 in the fishing position in the manner previously described.

When it is desired to move to a different location, stake 12 can simply be withdrawn from the ground and carried to a new location. When the rod holding device is being transported, it is preferred that lever 52 be released from bolt 64 in order to prevent inadvertent release of the trip lever from occurring while the device is being carried or otherwise transported.

The secure manner in which the fishing rod is held by the spring clip 28 and ring 42 prevents the rod from being pulled into the water or otherwise being subjected to damage. The construction of the device assures that the fishhook will be properly set in response to a true bite while avoiding "false bites" and other minor forces applied to the fishing line. Before the trigger wire 70 is triggered, it is necessary for the fishing line 40 to be pulled with a force that is sufficient to rotate bolt 64 far enough that bead 68 pushes flange 62 off of the bolt. Thus, minor forces applied to the fishing line are ignored by the device since they are insufficient in magnitude to disengage the trip lever 52 from bolt 64.

Preferably, the various components of the rod holding device 10 are constructed of steel which may be painted or provided with another protective coating. The surface of ring 42 is preferably coated with plastic in order to avoid scratching or otherwise damaging the fishing rod 36.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for holding a fishing rod having a fishing line carrying a fishhook, said apparatus comprising:
   a support;
   a pivot arm having front and back ends, said arm being mounted on said support for pivotal movement about a substantially horizontal pivot axis between a fishing position and a hook setting position;
   rod holding means on said arm for receiving and holding the fishing rod with the rod and line extending beyond said front end;
   spring means for urging said arm about said pivot axis in a direction toward the hook setting position;
   a bolt mounted on said pivot arm for axial rotation at a location offset from said pivot axis;
   a trip lever mounted on said support for pivotal movement between an engaged position wherein said lever engages said bolt in a manner to maintain the pivot arm in the fishing position, and a release position wherein the lever is displaced from the bolt to release said arm for movement to the hook setting position under the influence of said spring means;
   a trigger element connected rigidly with said bolt in extension therefrom for receiving the fishing line to effect rotation of said bolt when the trigger element is pulled by a pulling force applied to the fishing line; and
   a radial projection on said bolt located to engage said trip lever in a manner to displace same from engaged position to the release position when the bolt has been rotated axially through a predetermined arc sufficient to carry said projection against the trip lever.

2. Apparatus as set forth in claim 1, wherein said support comprises an elongate stake having a base end adapted to be set in the ground.

3. Apparatus as set forth in claim 1, wherein said rod holding means comprises bracket means on said arm for receiving and holding handle end of the rod on the back end of the arm and for receiving and holding the rod on the front end of the arm.

4. Apparatus as set forth in claim 1, wherein said rod holding means comprises:
   a spring clip on said back end of the arm for gripping a handle end of the rod by spring action; and
   a ring on said front end of the arm at a location to receive the rod in extension through the ring.

5. Apparatus as set forth in claim 1, including a flange on said trip lever at a location to hook on said bolt in the engaged position of said lever, said flange terminating in an edge which is engaged by said projection to displace the trip lever from the bolt to the release position of the lever.

6. Apparatus as set forth in claim 1, including means for adjusting said predetermined arc to adjust the amount of pulling force applied to the fishing line necessary to effect the release position of said trip lever.

* * * * *